US010316962B2

(12) United States Patent
Leone et al.

(10) Patent No.: US 10,316,962 B2
(45) Date of Patent: Jun. 11, 2019

(54) VEHICLE TRANSMISSION WITH ACCUMULATOR

(71) Applicant: Ford Global Technologies, LLC, Dearborn, MI (US)

(72) Inventors: Thomas G. Leone, Ypsilanti, MI (US); John Edward Brevick, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 650 days.

(21) Appl. No.: 14/997,609

(22) Filed: Jan. 18, 2016

(65) Prior Publication Data
US 2017/0204967 A1  Jul. 20, 2017

(51) Int. Cl.
F16H 61/00 (2006.01)
F16H 61/02 (2006.01)
(52) U.S. Cl.
CPC ..... *F16H 61/0267* (2013.01); *F16H 61/0021* (2013.01); *F16H 2061/0034* (2013.01)
(58) Field of Classification Search
CPC ............. F16H 61/0267; F16H 61/0021; F16H 2061/0034; F16H 61/0025
See application file for complete search history.

(56) References Cited

U.S. PATENT DOCUMENTS

| 7,654,354 B1 | 2/2010 | Otterstrom |
| 8,801,573 B2 | 8/2014 | Ohashi et al. |
| 9,266,519 B2 * | 2/2016 | Morino ................... F16H 61/00 |
| 2011/0077124 A1 * | 3/2011 | Moorman ........... F16H 61/0021 477/152 |
| 2011/0263381 A1 | 10/2011 | Katou |
| 2012/0309591 A1 | 12/2012 | Katou |
| 2014/0315687 A1 * | 10/2014 | Morino ............... F16H 61/0021 477/181 |

(Continued)

FOREIGN PATENT DOCUMENTS

| JP | 2011132993 A | 7/2011 |
| JP | 201287828 A | 5/2012 |

OTHER PUBLICATIONS

Ahn, Kyoung Kwan, et al., A Study on Energy Saving Potential of Hydraulic Control System Using Switching Type Closed Loop Constant Pressure System, Proceedings of the 7th JFPS International Symposium on Fluid Power, South Korea, Sep. 15-18, 2008, 6 pages.

*Primary Examiner* — David J Hlavka
(74) *Attorney, Agent, or Firm* — David Kelley; Brooks Kushman P.C.

(57) ABSTRACT

A vehicle powertrain includes an engine driven variable displacement pump and an accumulator. A switch network controls the flow of fluid among the pump, the accumulator, a line pressure circuit of a valve body, and the sump, enabling several operating modes. In a balanced operating mode, no fluid flows into or out of the accumulator. In a discharging mode, fluid flows from the accumulator reducing the power required by the pump to increase output torque or reduce fuel consumption. In a charging mode, fluid flows into the accumulator for later use. Fluid also flow into the accumulator in a high-torque mode in which the pump and switch network are set to intentionally increase the pump torque to assist in deceleration.

18 Claims, 3 Drawing Sheets

(56) References Cited

U.S. PATENT DOCUMENTS

| | | | |
|---|---|---|---|
| 2014/0357434 A1* | 12/2014 | Lundberg | F16H 9/125 |
| | | | 474/28 |
| 2014/0358389 A1 | 12/2014 | Lundberg et al. | |
| 2014/0360302 A1* | 12/2014 | Lundberg | F16H 61/0021 |
| | | | 74/473.11 |
| 2016/0298755 A1* | 10/2016 | Kotsuji | F16H 61/0021 |
| 2017/0306988 A1* | 10/2017 | Guo | F16H 61/0021 |
| 2018/0135743 A1* | 5/2018 | Guo | F16H 61/0021 |

* cited by examiner

VEHICLE TRANSMISSION WITH ACCUMULATOR

TECHNICAL FIELD

This disclosure relates to the field of motor vehicle powertrains and associated controls. More particularly, the disclosure pertains to a powertrain having an accumulator for storing pressurized fluid.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

The transmission speed ratio may be controlled by adjusting the pressure of hydraulic fluid supplied to various clutches and/or to a variator. Commonly, the fluid is pressurized by a pump driven by the transmission input which, in turn, is driven by the engine crankshaft. The transmission pump syphons power from the engine that could otherwise be used to propel the vehicle. Therefore, it is desirable to minimize the utilization of the pump. Belt variators, which control ratio by adjusting the radius of sheaves, are known to require relatively high fluid flow rates and fluid pressures. Therefore, minimizing the utilization of the pump to supply the pressurized fluid is particularly beneficial in transmissions that employ such variators.

SUMMARY OF THE DISCLOSURE

A vehicle includes power transfer components, an engine-driven pump, and a controller. The power transfer components are configured to establish a power flow path from an engine to vehicle wheels in response to hydraulic pressure. The power transfer components may include a hydraulically actuated variator such as a belt variator and/or at least one hydraulically actuated clutch. The controller is programmed to estimate an engine marginal efficiency and to respond to the engine marginal efficiency being less than a first threshold by setting a pump displacement to provide less than a flow demand of the power transfer components with a remainder of the flow demand provided from an accumulator. The controller may be further programmed to, at other times, set the displacement of the pump to provide more that the flow demand and to direct the surplus flow into the accumulator. The accumulator may be charged in response to the engine marginal efficiency being greater than a second threshold or in response to a negative wheel torque demand.

A transmission includes power transfer components, a variable displacement pump driven by the transmission input, an accumulator, and a controller. The power transfer components are configured to establish a power flow path from the transmission input to the transmission output in response to hydraulic pressure. The controller is programmed to, while the output is rotating, set the displacement of the pump to provide less than a flow demand while a remainder of the flow demand is provided from the accumulator. The transmission may also include a valve body and a switch circuit. The valve body is configured to direct fluid from a line pressure circuit to the power transfer components in response to commands from the controller. The switch circuit has a fluid node configured to receive fluid from the pump. A first valve selectively fluidly connects the node to the accumulator. A second valve selectively fluidly connects the node to the line pressure circuit. A third valve may selectively fluidly connect the node to a sump. The node may receive fluid from the pump via a fourth valve.

A method of operating a vehicle includes, during some time periods, setting the displacement of a pump greater than necessary to satisfy a flow demand and directing excess flow to an accumulator and, in response to an engine marginal efficiency being less than a first threshold, setting the displacement of the pump to provide less than the flow demand and providing a remainder of the flow demand from the accumulator. The accumulator may be charged, for example, in response to the engine marginal efficiency being greater than a second threshold. Alternatively or additionally, the accumulator may be charged in response to a negative wheel torque demand.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
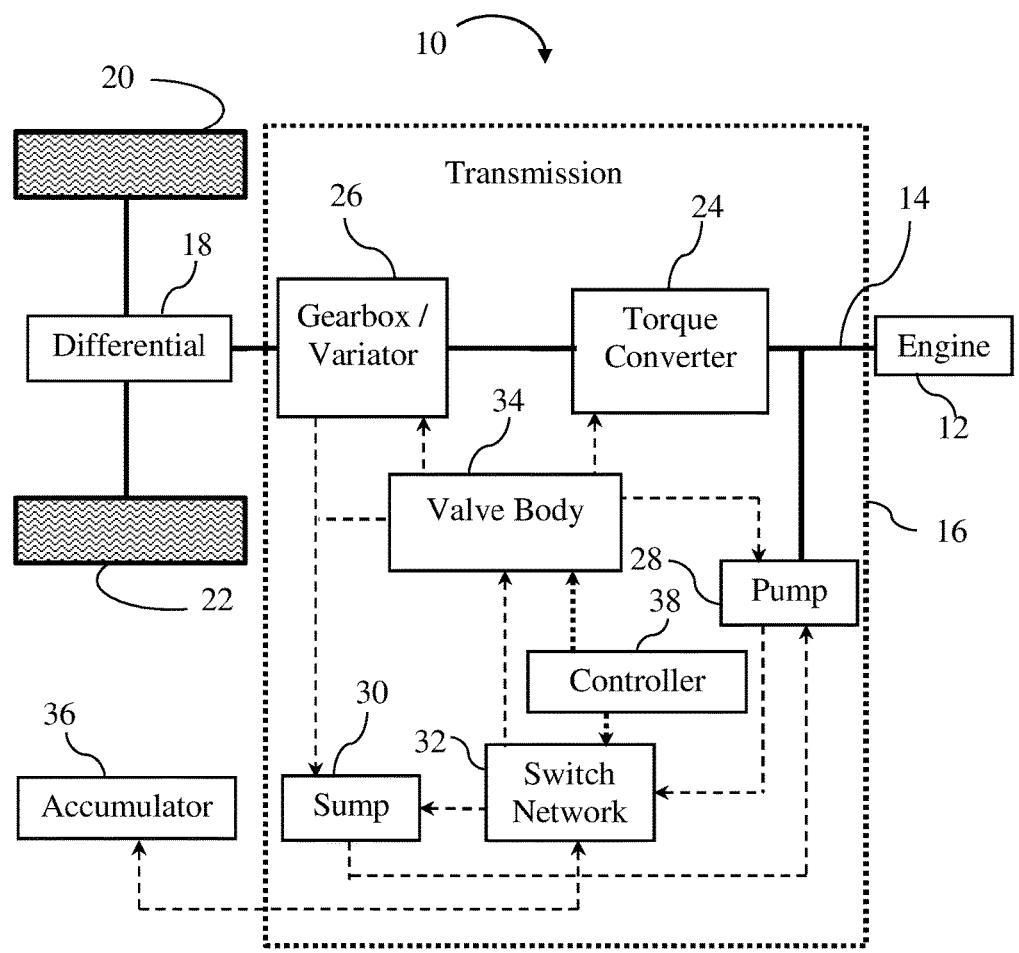
FIG. 1 is schematic diagram of a vehicle powertrain.

FIG. 1 illustrates a vehicle powertrain system 10. Mechanical power flow connections are indicates with solid bold lines while the flow of hydraulic fluid is indicated with dashed lines. Electrical control signals are indicated by bold dotted lines. An internal combustion engine 12 drives a crankshaft 14 which supplies input power to transmission 16. The transmission 16 adjusts the speed and torque and delivers the power to differential 18. Differential 18 divides the power between left and rights wheels 20 and 22 while allowing slight speed differences as the vehicle turns a corner.

Within transmission 16, the speed and torque are adjusted by two components, torque converter 24 and gearbox 26.

Torque converter 24 includes an impeller and turbine that transmit power hydro-dynamically whenever the impeller rotates faster than the turbine. It may also include a stator that multiplies the torque. The torque converter may also include a bypass clutch that, when engaged, transmits power mechanically from the impeller to the turbine without the parasitic losses associated with hydro-dynamic power transfer. Gearbox 26 includes gearing and shift elements arranged such that engaging various subsets of the clutches establish various power flow paths. The different power flow paths have different speed ratios. In a Continuously Variable Transmission (CVT), the gearing includes a variator that is capable of transmitting power at any speed ratio between predetermined upper and lower bounds. The gearbox of a CVT typically also includes shift elements and gearing that selectively establish either a forward power flow path or a reverse power flow path. The gearing may also be configured to alternately establish multiple forward range power flow paths.

Pump 28 draws fluid from sump 30 and supplies the fluid, at elevated pressure, to switch network 32. The quantity of fluid supplies is based on engine speed and on a parameter of the pump geometry called pump displacement. Switch network 32 directs the flow from the pump tp one or more of the sump 30, a valve body 34, and an accumulator 36. The switch network may also direct flow from accumulator 36 to sump 30 or valve body 34. Valve body 34 supplies the fluid to torque converter 24 and gearbox 26 at controlled pressures less than the input pressure to control the torque capacity of shift elements and to control the ratio of the variator. The valve body also supplies fluid to the hydro-dynamic chamber of torque converter 24 and supplies fluid for lubrication to gearbox 26. Fluid travels from gearbox 26 and valve body 34 back to the sump 30 to complete the cycle. Valve body 34 may also send fluid at a controlled pressure to pump 28 to adjust the pump displacement.

Figure 2:
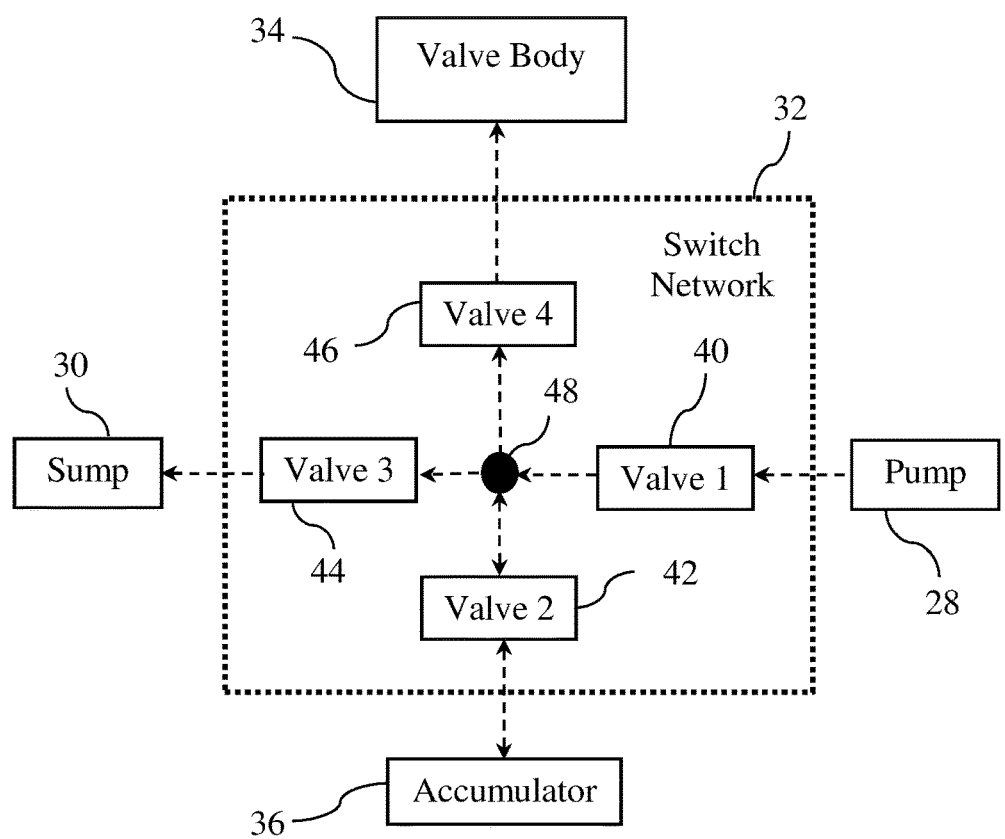
FIG. 2 is a schematic diagram of a hydraulic switch network suitable for use in the vehicle powertrain of FIG. 1.

FIG. 2 illustrates one configuration of the switch network 32. Valves 40, 42, 44, and 46 connect pump 28, accumulator 36, sump 30, and valve body 34 respectively to a common node 48. Each valve is controlled to be in one of three states. In an open state, the valve allows virtually unrestricted flow such that the pressure on either side of the valve is approximately equal. In a closed state, the valve allows no flow and the pressures on either side of the valve may differ substantially. In a modulated state, the size of the flow restriction is regulated to allow some flow from whichever side has higher pressure to the side with lower pressure. The flow rate increases as the pressure difference increases and as the size of the opening increases. Energy is lost as fluid flows through a modulating valve. The rate of energy loss is proportional to the flow rate and to the pressure difference. The state of each valve, and the size of the opening in modulated state, is determined by electrical currents from controller 38. Switch network 32 may be integrally formed into valve body 34 since both include a number of valves under the control of the controller.

The flow rate from pump 28 is proportional to engine speed and proportional to pump displacement. The pressure leaving pump 28 is dependent on downstream restrictions. Pump outlet pressure increases as downstream resistance decreases. The torque required to rotate pump 28 is proportional to the outlet pressure (assuming negligible inlet pressure) and proportional to the pump displacement. The power required by pump 28 is proportional to the torque and also proportional to engine speed. The pressure of accumulator 36 depends on the quantity of fluid in the accumulator. As the quantity of stored fluid increases, the pressure increases.

The pressure of sump 30 is near atmospheric pressure. All other pressures in the system are measured relative to this pressure. The pressure entering valve body 34 is called line pressure. Since the valves in the valve body can decrease pressure but not increase pressure, line pressure must be maintained higher than the highest required control pressure of torque transfer components in gearbox 26. Typically, a transmission valve body includes a regulator valve that controls the line pressure. In the transmission of FIG. 1, this function may be performed by switching network 32. Additionally, the flow rate into valve body 34 must exceed the sum of any leakage and any lubrication and cooling requirements.

The valves of switch network 32 can be controlled in a number of different ways in different operating conditions. In a balanced mode of operation, the pressure and flow requirements of the valve body are satisfied entirely and exclusively by pump 28. In this state, valves 1 and 4 are open. Nominally, valves 2 and 3 are closed. The displacement of pump 28 is set large enough to ensure that the line pressure meets or exceeds the requirement and the flow rate meets or exceeds the requirement. If the line pressure exceeds the accumulator pressure and the flow rate exceeds the requirement, valve 2 may be modulated to divert some flow into the accumulator. This may occur, for example, when the minimum pump displacement provides more flow than required, such as when engine speed is relatively high. In this operating mode, charging of the accumulator is a beneficial side-effect but not the primary purpose. If there is excess flow and either the line pressure is less than the accumulator pressure or the accumulator is full, then valve 3 may be modulated to divert some of the flow back to the sump.

In a discharging operating mode, fluid stored in the accumulator may be used to supplement the flow provided by the pump. This is only possible when the accumulator pressure exceeds the line pressure requirement. Valves 1 and 4 are open, valve 3 is closed, and valve 2 is modulated. Valve 2 and pump displacement are controlled in a coordinated manner to ensure that the line pressure satisfies the requirement and the flow rate satisfies the requirement. To use more stored fluid and reduce pump load, valve 2 is opened wider and the displacement of pump 28 is reduced. This mode may be selected when reducing pump torque is desirable. For example, this mode may be invoked when the driver demands acceleration. Also, this mode may be invoked when the valve body flow requirements are temporarily higher, such as when changing speed ratios.

In a charging operating mode, the pump and switch network may be controlled to systematically charge the accumulator with fluid. Nominally, valves 1, 2, and 4 are open and valve 3 is closed. The pump displacement is set to provide more than the required flow rate of the valve body. If the required line pressure is less than the accumulator pressure, then valve 4 may be modulated, raising the pressure at node 48 to more than the accumulator pressure so that fluid flows into the accumulator. This limits the energy storage efficiency, so selecting this mode is less desirable when the required line pressure is less than the accumulator pressure. If the line pressure falls below the required level while valve 4 is open, then valve 2 is modulated to limit the flow being diverted into the accumulator.

In a high-torque operating mode, the pump and switch network may be controlled to intentionally increase pump torque. For example, during a vehicle deceleration, pump torque may be desirable to increase engine braking. During such events, it is beneficial to capture energy in the accumulator so that the energy may be used later to improve performance or reduce fuel consumption. In this mode, the displacement of pump 28 is set at its maximum value. Nominally, valves 1, 2, and 4 are open and valve 3 is closed. If the flow rate into the valve body and the line pressure both exceed the requirement, then valve 4 may be modulated, raising the pressure at node 48 to increase the flow into accumulator 36. If the line pressure or flow rate into valve body 34 falls below the required level while valve 4 is open, then valve 2 is modulated to limit the flow being diverted into the accumulator. If the pressure at node 48 is less than the accumulator pressure, then valve 2 should be closed. If the accumulator is full and the flow into the valve body is above an acceptable limit, then valve 3 may be modulated to divert flow to the sump. Finally, valve 1 may be modulated to increase the pump pressure while maintaining a desired pressure at node 48. Modulating valve 1 increases the pump torque but dissipates the additional pump energy as opposed to capturing it for later use.

During positive torque driving situations, the engine consumes fuel to provide propulsion. Any torque delivered to pump 28 necessitates increasing the engine torque output in order to provide the desired propulsion torque to the wheels. Increasing the engine torque, at a given engine speed, increases the rate of fuel consumption. However, the amount of fuel consumption increase for a given amount of pump power increase is not the same in all operating conditions. For example, internal combustion engines typically are most efficient at relatively high torques and inefficient at low torques. When the engine is in an efficient operating condition, it may be desirable to operate in the charging operating mode to enable later operation in the discharging mode when the engine is less efficient. Although fuel consumption increases while in the charging mode, it may decrease by a larger amount while in the discharging mode, reducing total fuel consumption.

Figure 3:
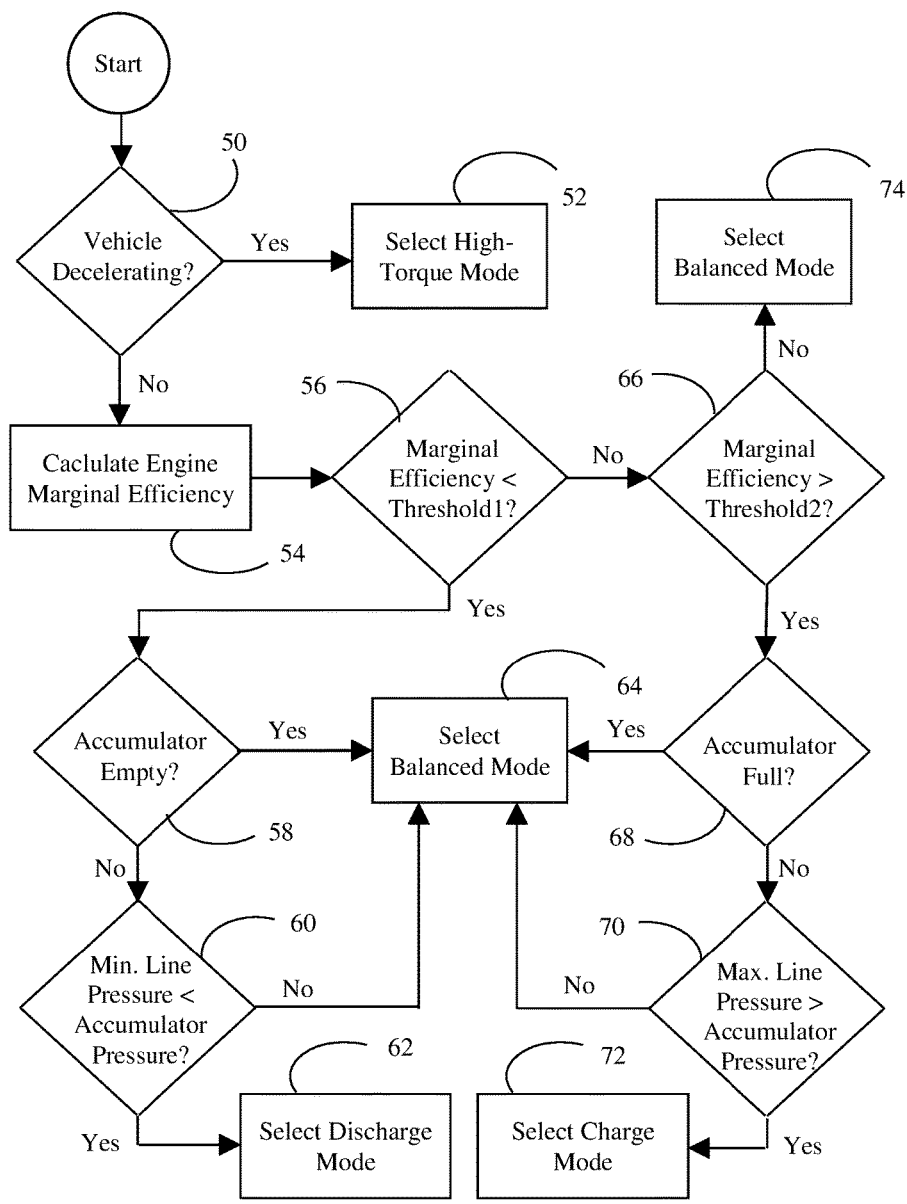
FIG. 3 is a flow chart for selecting among the several operating modes of the vehicle powertrain of FIG. 1.

FIG. 3 is a flow chart indicating exemplary logic for selecting among the operating modes described above. The process begins at 50 by determining whether or not the vehicle is decelerating. For example, the controller may concluded that the vehicle is decelerating based on a negative driver torque demand. If the vehicle is decelerating, the controller selects high-torque mode at 52. If the vehicle is not decelerating, the controller calculates the engine marginal efficiency at 54. If the marginal efficiency is less than a first threshold, as determined at 56, then the controller proceeds to determine if conditions are appropriate for use of discharge mode to reduce engine torque and fuel consumption. If the accumulator is not empty, as determined at 58, and the minimum required line pressure is less than the accumulator pressure, as determined at 60, then discharge mode is selected at 62. If either of these conditions are not satisfied, then balanced mode is selected at 64. If the marginal efficiency is greater than a second threshold, as determined at 66, then the controller proceeds to determine if conditions are appropriate for use of charge mode to prepare for later use of discharge mode. If the accumulator is not already full, as determined at 68, and a line pressure greater than the accumulator pressure is acceptable, as determined at 70, then discharge mode is selected at 72. If either of these conditions are not satisfied, then balanced mode is selected at 64. If the marginal efficiency is between the two thresholds, then balanced mode is selected at 74.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle comprising:
   power transfer components configured to establish a power flow path from an engine to vehicle wheels in response to hydraulic pressure;
   an engine-driven pump; and
   a controller programmed to, in response to an engine marginal efficiency being less than a first threshold, set a displacement of the pump to provide less than a flow demand of the power transfer components while a remainder of the flow demand is provided from an accumulator.

2. The vehicle of claim 1 wherein the power transfer components comprise a gearbox having a hydraulically actuated variator.

3. The vehicle of claim 1 wherein the power transfer components comprise a gearbox having at least one hydraulically actuated clutch.

4. The vehicle of claim 1 wherein the controller is further programmed to set the displacement of the pump to provide more than the flow demand of the power transfer components and direct a surplus flow into the accumulator.

5. The vehicle of claim 4 wherein the controller is programmed to set the displacement of the pump to provide more than the flow demand of the power transfer components and direct the surplus flow into the accumulator in response to the engine marginal efficiency being greater than a second threshold.

6. The vehicle of claim 4 wherein the controller is programmed to set the displacement of the pump to provide more than the flow demand of the power transfer components and direct the surplus flow into the accumulator in response to a negative wheel torque demand.

7. The vehicle of claim 1 further comprising:
   a valve body configured to direct fluid from a line pressure circuit to the power transfer components in response to commands from the controller; and
   a switch circuit defining a fluid node configured to receive fluid from the pump, a first valve selectively fluidly connecting the node to the accumulator, and a second valve selectively fluidly connecting the node to the line pressure circuit.

8. The vehicle of claim 7 wherein the switch circuit further comprises a third valve selectively fluidly connecting the node to a sump.

9. The vehicle of claim 8 wherein the switch circuit further comprises a fourth valve selectively restricting flow of fluid from the pump to the node.

10. A transmission comprising:
  power transfer components configured to establish a power flow path from an input to an output in response to hydraulic pressure;
  a variable displacement pump driven by the input;
  an accumulator; and
  a controller programmed to, while the output is rotating, set the displacement of the pump to provide less than a flow demand of the power transfer components while a remainder of the flow demand is provided from the accumulator.

11. The transmission of claim 10 wherein the power transfer components comprise a gearbox having a hydraulically actuated variator.

12. The transmission of claim 10 wherein the power transfer components comprise a gearbox having at least one hydraulically actuated clutch.

13. The transmission of claim 10 further comprising:
  a valve body configured to direct fluid from a line pressure circuit to the power transfer components in response to commands from the controller; and
  a switch circuit defining a fluid node configured to receive fluid from the pump, a first valve selectively fluidly connecting the node to the accumulator, and a second valve selectively fluidly connecting the node to the line pressure circuit.

14. The transmission of claim 13 wherein the switch circuit further comprises a third valve selectively fluidly connecting the node to a sump.

15. The transmission of claim 14 wherein the switch circuit further comprises a fourth valve selectively restricting flow of fluid from the pump to the node.

16. A method of operating a vehicle comprising:
  setting a displacement of an engine driven variable displacement pump greater than necessary to satisfy a hydraulic fluid flow demand and directing an excess flow to an accumulator; and
  in response to an engine marginal efficiency being less than a first threshold, setting the displacement of the pump to provide less than the flow demand and providing a remainder of the flow demand from the accumulator.

17. The method of claim 16 wherein the displacement of the pump is set greater than necessary to satisfy the flow demand in response to the engine marginal efficiency being greater than a second threshold.

18. The method of claim 16 wherein the displacement of the pump is set greater than necessary to satisfy the flow demand in response to a negative wheel torque demand.

* * * * *